United States Patent [19]

Franzen et al.

[11] 4,232,096
[45] Nov. 4, 1980

[54] COMPOSITE STEEL MATERIAL AND COMPOSITE STEEL TOOL MADE FROM THIS MATERIAL

[75] Inventors: Olof K. Franzen, Hedemora, Sweden; Ulf Hallström, L'Etang la ville, France; Bengt A. Petersson, Söderfors, Sweden

[73] Assignee: Uddeholms Aktiebolag, Hagfors, Sweden

[21] Appl. No.: 5,908

[22] Filed: Jan. 23, 1979

Related U.S. Application Data

[63] Continuation of Ser. No. 860,048, Dec. 13, 1977, abandoned.

[30] Foreign Application Priority Data

Dec. 17, 1976 [SE] Sweden .................. 7614267

[51] Int. Cl.² ............... C22C 38/06; B32B 15/18
[52] U.S. Cl. ................. 428/683; 75/126 C; 75/126 E; 148/36; 428/685; 428/932
[58] Field of Search .............. 75/126 C, 126 E; 428/683, 685, 932; 148/36

[56] References Cited

U.S. PATENT DOCUMENTS

| | | | |
|---|---|---|---|
| 2,837,421 | 6/1958 | Kron | 148/36 |
| 2,968,549 | 1/1961 | Brady et al. | 75/126 E |
| 3,930,426 | 1/1976 | Berggren et al. | 428/683 |
| 4,058,650 | 11/1977 | Kiyonago et al. | 148/36 |

FOREIGN PATENT DOCUMENTS 2412350  9/1974  Fed. Rep. of Germany .

OTHER PUBLICATIONS

Stahlschlussel, 1965, p. 48. (steel grade 46).
"Germany's Tool and Special Steels," Steel, 9/45, p. p. 120 (WP, GS1, LDM Special) p. 124 (CVM1).

Primary Examiner—L. Dewayne Rutledge
Assistant Examiner—W. G. Saba
Attorney, Agent, or Firm—Burns, Doane, Swecker & Mathis

[57] ABSTRACT

A composite steel material consisting of two metallically joined steel components having different chemical compositions is disclosed. The first component is a high-speed tool steel or other high alloy tool steel having a carbon activity and a hardness and wear resistance in the same order as that of high speed tool steel. The second component is a steel consisting essentially of 0.40–0.45 weight percent carbon, 0.40–1.00 weight percent silicon, 0.40–1.00 weight percent manganese, 2.5–4.0 weight percent chromium, 0.50–1.50 weight percent molybdenum, 0.20–0.45 weight percent vanadium, balance iron and normal impurities.

3 Claims, 4 Drawing Figures

COMPOSITE STEEL MATERIAL AND COMPOSITE STEEL TOOL MADE FROM THIS MATERIAL

This is a continuation, of application Ser. No. 860,048, filed Dec. 13, 1977 now abandoned.

This invention relates to a composite steel-bimetal-material consisting of two metallically joined steel components having different chemical compositions. The invention also relates to a composite steel tool made from this material. Examples on such tools are saw blades and knives of all kinds, milling cutters, lathe tools, and rolling mill rolls. More particularly this invention relates to a composite steel material for tools in which the material of the working area constitutes one of the two steel components and is made from high speed tool steel or other high alloyed tool steel having a carbon activity and a hardness and wear resistance in the same order as that of high speed tool steel, while the second component of the composite steel material constitutes the backing material of the tool.

The working area component of the material suitably consists of a standardized high speed tool steel, as for example grade SIS 14 27 22 (Swedish Standard). The high speed tool steel may be produced according to conventional technique. More suitably, however, the high speed tool steel is made according to the ASEA-STORA-process. Such high speed steels, which may have a standardized or non-standardized chemical composition, are generally known as ASP®-steels. The ASEA-STORA-process is disclosed i.e. in "Iron and Steel, Special Issue", p. 49–52, and in "Jernkontorets Annaler 156 (1972)", p. 84–90.

The components may be joined by casting, welding, hot rolling or other convential processes known in the art. Preferably, however, the components are joined according to a technique disclosed in the Swedish patent application No. 5151/72 and in the Canadian patent specification No. 970,661. This technique involves forming an electrode from a first component consisting of a tool steel intended for the working area of the finished tool; placing two plane parallel plates of a second steel component intended for the backing material of the finished tool with a narrow space therebetween; closing the space between the plates at the bottom and at the sides; forming drops of said first component by electric melting of the electrodes, said drops being introduced into the space between the plates; continously solidifying the drops to form a casting which joins the plates and forms a billet composed of three parallel parts; hot and cold working the billet to a blank of desired form and thickness; and slotting the blank along the centre of the middle part composed of said tool steel component intended for the working area of the finished tool.

The demands which are raised upon the backing material of the composite steel may be summarized in the following way.

The backing material shall have a proper strength also after it having been exposed to a heat treating aiming at giving optimal features to the working component of the composite steel. Too a high strength may cause that the backing material will not have sufficient ability to stop the propagation of cracks initiated in the working tool steel component. On the other hand too a low strength may cause deformation of the backing material. In the case when the composite steel tool is a hacksaw blade this may give rise to deflected sawing. Suitably the backing material of a composite hacksaw blade, where the working component is a high speed tool steel, shall meet with the following requirements also after hardening the hacksaw blade by heating to 1220° C. followed by quenching and tempering twice at 560° C./1 h:

$R_p\ 0.2\ (\sigma 0.2) - 1.3\ KN/mm^2$ $R_m\ (\sigma_B) \geqq 1.5\ KN/mm^2$ $A_{10(\delta 10)} \geqq 6\%$ $Z\ (\Psi) \geqq 20\%$ where the designations which are not within brackets refer to international units (SI-units) (Systéme International d' unités).

The chemical composition of the backing material shall be harmonized to that of the high speed steel or corresponding tool steel so that as narrow carbon affected zone as possible in the region of the joint between the components is achieved. If the carbon content of the high speed tool steel component is increased due to diffusion of carbon from the backing material, the strength of the high speed tool steel may be impaired. Carbon diffusion is stimulated by long time treatments at high temperatures, such as is the case when a stock is produced according to said Swedish patent application No. 5151/72 (Canadian patent specification No. 970,661) including long time heat treatments and hot rolling at about 1100° C., as well as hardening of the hacksaw blade from a temperature of about 1220° C.

Demands, as far as cleanliness from slag inclusions are concerned, are also raised upon the backing material in order to improve its fatigue resistance and cracking resistance. Further the backing shall have such features that a good welding-up to the tool steel component is obtained at the production of the composite steel material.

It is a primary object of the invention to suggest a composite steel material which will meet with the above mentioned demands. We have surprisingly found that this object can be achieved if a first component of the composite steel consists of a high speed tool steel or other high alloy tool steel having a carbon activity and a hardness and a wear resistance in the same order as that of high speed tool steel, while a second component of the composite steel is a steel essentially consisting of 0.30–0.60 weight-% carbon
0.40–1.00 weight-% silicon
0.40–1.00 weight-% manganese
2.5–4.0 weight-% chromium
0.50–1.50 weight-% molybdenum
0.20–0.45 weight-% vanadium
balance iron and normal impurities A preferred composition of the backing material consists essentially of 0.40–0.45 weight-% carbon
0.50–0.90 weight-% silicon
0.50–1.00 weight-% manganese
3.0–3.5 weight-% chromium
0.60–1.10 weight-% molybdenum
0.25–0.30 weight-% vanadium
max 0.5 weight-% nickel
balance iron and normal impurities The characteristic features of the invention will now be described with reference to experiments and tests which have been carried out and to the accompanying drawings, in which FIG. 1 shows a composite steel-bimetal-material according to the invention;

Figure 1:
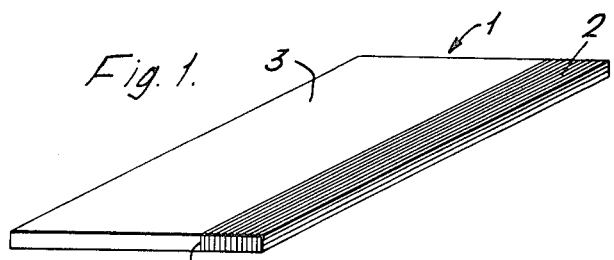

Referring first to FIG. 1 a composite steel material is generally designated 1. A high speed tool steel component is designated 2 and a backing material component having a composition according to the invention is designated 3. The metallic joint between the two components is designated 4.

Figure 2:
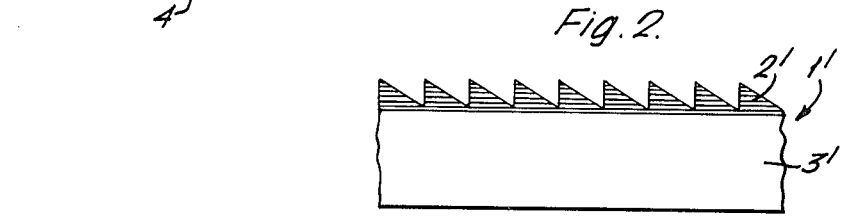
FIG. 2 shows a section of a hacksaw blade made from the composite steel-bimetal-material of the invention.

FIG. 2 shows a section of a composite hacksaw blade 1' made from the stock shown in FIG. 1. The teeth of the hacksaw blade made from the high speed tool steel component has been designated 2' and the backing has been designated 3'.

EXPERIMENTS

Testing materials were made by electrically melting high speed tool steel electrodes between two steel plates according to the above mentioned remelting technique which is described more in detail in the Swedish patent application 5151/72 (Canadian patent specification No. 970,661) to form composite billets composed of three parallel parts. The billets had the size 6" × 6" and were hot rolled to $\phi$ 3 mm. Thereafter they were heat treated by preheating to 550° C. and 850° C., and hardened by heating to three different temperatures, viz. 1180° C., 1200° C. and 1220° C. Finally the specimens were tempered twice at 560° C./1 h.

In all the materials tested the high speed tool steel consisted of grade SIS 14 27 22 (Swedish standards) having the nominal chemical composition in percent by weight:
- 0.85% C
- 0.25% Si
- 0.3% Mn
- 4% Cr
- 5% Mo
- 6.5% W
- 1.9% V
- balance iron and normal impurities.

Figure 3:
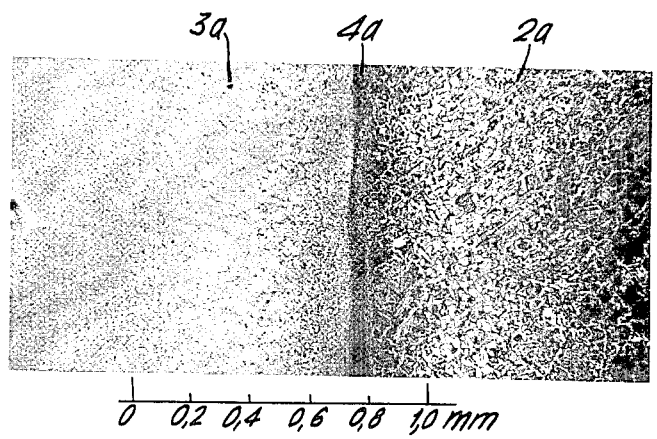
FIG. 3 is a microphoto showing the structure of a portion of a composite steel material after hardening and tempering, said material being not composed according to the invention.

In one case the backing material consisted of a plain carbon steel containing about 0.6% C. FIG. 3 shows the structure of this composite material after hardening from 1220° C., tempering twice at 560° C./1 h. In FIG. 3 the high speed tool steel component is designated 2a and the plain carbon steel backing material is designated 3a. The joint between the components is designated 4a. It is evident from a study of the microphoty that the carbon content of the backing material 3a has been reduced and that the high speed steel component 2a has been accordingly carburized. The material in the region of the joint 4a has been considerably affected.

Figure 4:
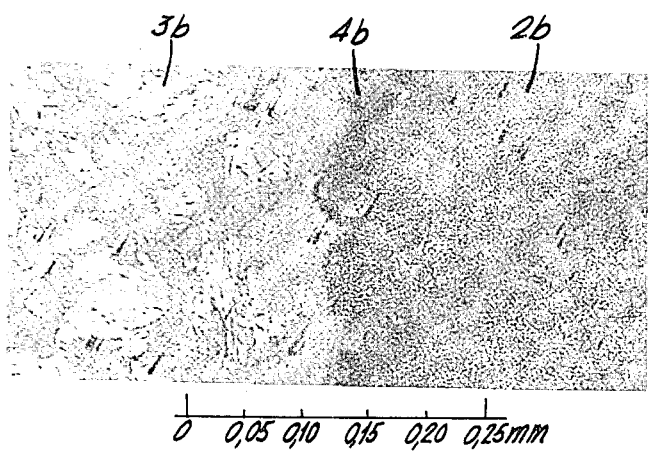
FIG. 4 is a microphoto showing the structure of a portion of a composite steel material according to the present invention after hardening and tempering.

In a second case the backing material was given the following composition in terms of percent by weight: 0.42 C; 0.72 Si; 0.70 Mn; 0.006 S; 3.24 Cr; 0.001 Ni; 0.81 Mo; 0.02 W; 0.28 V; 0.001 Cu; 0.031 Al, balanced essentially all iron and other normal impurities than those above mentioned. FIG. 4 shows a microphoto of a composite steel containing this backing material which is designated 3b. The high speed tool steel 2b was the same, grade SIS 14 27 22, as in the previous example described with reference to FIG. 3. Also the heat treatment was the same. In the present case there was registered no diffusion of carbon between the two components. As a consequence to this also the material in the joint 4b between the components is smooth and essentially non-affected which proves that the two components are well adapted to each other.

The mechanical properties of the backing material used according to the invention were also evaluated. The following results were achieved (average values):

| Hardening temp°C. | $R_m$ KN/mm² | $R_p$ 0.2 KN/mm² | $A_{10}$ % | Z % |
|---|---|---|---|---|
| 1180 | 1.77 | 1.44 | 8 | 24 |
| 1200 | 1.77 | 1.46 | 7 | 22 |
| 1220 | 1.77 | 1.47 | 8 | 21 |

We claim:
1. Composite steel material consisting of two metallically joined steel components having different chemical compositions, characterized in that a first component is a high speed tool steel or other high alloy tool steel having a carbon activity and a hardness and wear resistance in the same order as that of high speed tool steel, and that a second component is a steel essentially consisting of
   - 0.40–0.45 weight-% carbon
   - 0.40–1.00 weight-% silicon
   - 0.40–1.00 weight-% manganese
   - 2.5–4.0 weight-% chromium
   - 0.50–1.50 weight-% molybdenum
   - 0.20–0.45 weight-% vanadium
   - balance iron and normal impurities

2. Composite steel material according to claim 1, characterized in that the second component is a steel essentially consisting of
   - 0.40–0.45 weight-% carbon
   - 0.50–0.90 weight-% silicon
   - 0.50–1.00 weight-% manganese
   - 3.0–3.5 weight-% chromium
   - 0.60–1.10 weight-% molybdenum
   - 0.25–0.30 weight-% vanadium
   - max 0.5 weight-% nickel
   - balance iron and normal impurities 3. Composite steel tool characterized in that it is made from a composite steel material according to claim 1.

* * * * *